United States Patent [19]

Gigla

[11] Patent Number: 4,924,957
[45] Date of Patent: May 15, 1990

[54] ADJUSTABLE INSTRUMENT PANEL FOR VEHICLES

[75] Inventor: Joachim Gigla, Mainz, Fed. Rep. of Germany

[73] Assignee: General Motors Corporation, Detroit, Mich.

[21] Appl. No.: 195,984

[22] Filed: May 19, 1988

[30] Foreign Application Priority Data

Jun. 27, 1987 [DE] Fed. Rep. of Germany ....... 3721289

[51] Int. Cl.$^5$ ............................................. B30K 37/06
[52] U.S. Cl. ...................................... 180/90; 296/70; 439/544
[58] Field of Search ........................... 180/90; 296/70; 439/544; 248/DIG. A

[56] References Cited

U.S. PATENT DOCUMENTS

| 4,568,404 | 2/1986 | Herring | 180/90 |
| 4,668,004 | 5/1987 | Tsunoda et al. | 180/90 |
| 4,724,918 | 2/1988 | Raineri | 180/90 |

FOREIGN PATENT DOCUMENTS

| 1920326 | 4/1965 | Fed. Rep. of Germany . |
| 1921386 | 4/1965 | Fed. Rep. of Germany . |
| 8337425 | 5/1984 | Fed. Rep. of Germany . |
| 3333138 | 3/1985 | Fed. Rep. of Germany . |
| 3339613 | 5/1985 | Fed. Rep. of Germany . |

*Primary Examiner*—Richard A. Bertsch
*Attorney, Agent, or Firm*—Charles E. Leahy

[57] ABSTRACT

An instrument panel for motor vehicles, has individually detachably fitted instruments and units, which consists of an electrically nonconductive material, preferably plastic. The instrument panel has integrated electrical conductors which become operatively connected to electrical terminals associated with the instruments or units when the instruments or units are fitted on. The instruments or units each have a mounting base cooperating with an associated hole provided in the instrument panel, the mounting base having a holder and a clipnose type tension spring. The positions of the instruments and units can be adjusted in the assembled position to the optimal angle of view of the vehicle operator, which can be achieved by turning the instruments and units.

3 Claims, 3 Drawing Sheets

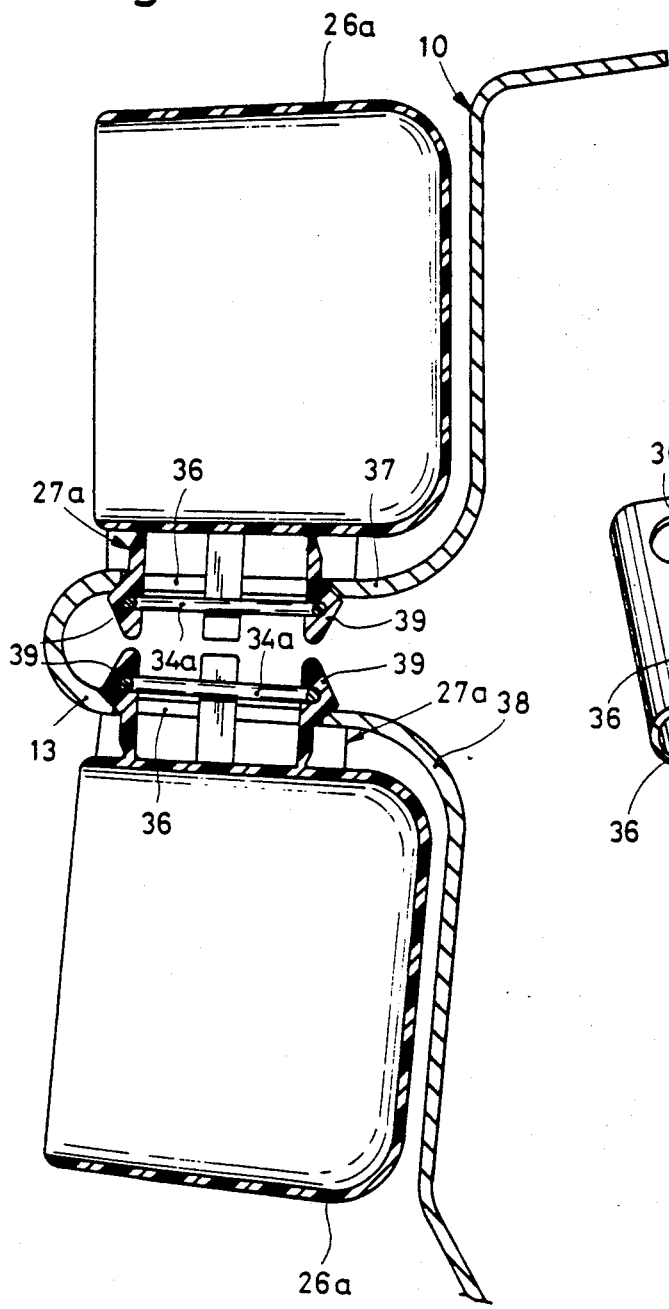

4,924,957

ADJUSTABLE INSTRUMENT PANEL FOR VEHICLES

The present invention pertains to an instrument panel for vehicles, in particular motor vehicles, with individually detachably fitted instruments and units, which is made of an electrically nonconductive material, preferably plastic, and comprises integrated electrical conductors, which, when the instruments or units are fitted on, become operatively connected to electrical terminals associated therewith.

BACKGROUND OF THE INVENTION

An instrument panel of the above-described type is disclosed in DE-GM No. 83 37 25, in which an instrument carrier is mounted in the modular system on two shell parts made of plastic which are fitted together in a sandwich-like arrangement, with instruments and units being individually detachably mounted on the instrument carrier. The instrument carrier has integrated electrical plug contact jacks which become operatively connected with associated plug contacts of the instruments and units when the instruments and units are fitted on.

A similar arrangement is also disclosed in German DE-OS No. 33 33 138, patented March 28, 1985. Each display and/or control member is designed as a module in this case as well, and the display and/or control members are integrated into a control panel unit immediately next to each other or with intercalation of a matching blind panel. Electrical conductors lead to the individual display and/or control units.

Both arrangements according to the state of the art as outlined above share the disadvantage that fastening of the module units (instrument casings) to the instrument panel is expensive. In addition, the instruments and units are rigidly aligned with respect to a given seating position.

SUMMARY OF THE INVENTION

The task of the present invention is to remedy this situation, i.e., to further improve an instrument panel of the type described in the introduction so that variable positions of the instruments and units on the instrument panel can be realized with simple means.

This task is accomplished according to the present invention in that the instruments and units have mounting bases which comprise a holder and a clip-nose-type tension spring and cooperate with an associated hole in the instrument panel.

According to a preferred embodiment of the present invention, the hole and accordingly also the mounting base are circular and — in the assembled position of the instrument or unit — the holder, on the one hand, and the tension spring, on the one hand, engage behind the hole at two diametrically opposed or essentially diametrically opposed points.

Another advantageous embodiment of the present invention is characterized in that the hole and accordingly also the mounting base are circular and has the mounting base comprises — as a holder — two elastically deformable holding elements at two diametrically opposed or essentially diametrically opposed points, and the holding members engage behind the hold in the assembled state of the instrument or unit and the holding member can be forced apart by a tension spring.

The device according to the present invention is inexpensive because the mounting base, including the holder, can be manufactured in a simple manner and without subsequent finishing as a one-piece plastic injection molding together with the instrument casing. This is also true of the instrument panel, including its holes.

The instruments and units can advantageously be removed from the instrument panel quickly and frequently without using a tool. Due to the circular hole in the instrument panel and the matching circular mounting base, every individual instrument or unit can be turned toward the driver (or front-seat passenger). Nearly optimal reading of the instruments and operation of the units are thus possible.

Further modifications and advantages of the present invention can be found in the claims.

BRIEF DESCRIPTION OF THE DRAWINGS

Examples, which will be shown in the drawings and described below, will be given to illustrate the present invention in greater detail.

FIG. 5 shows a section taken through the instrument panel.

FIG. 6 shows the vertical section taken through the instrument panel with instruments mounted on both sides.

DESCRIPTION OF THE PREFERRED EMBODIMENT

Figure 1:
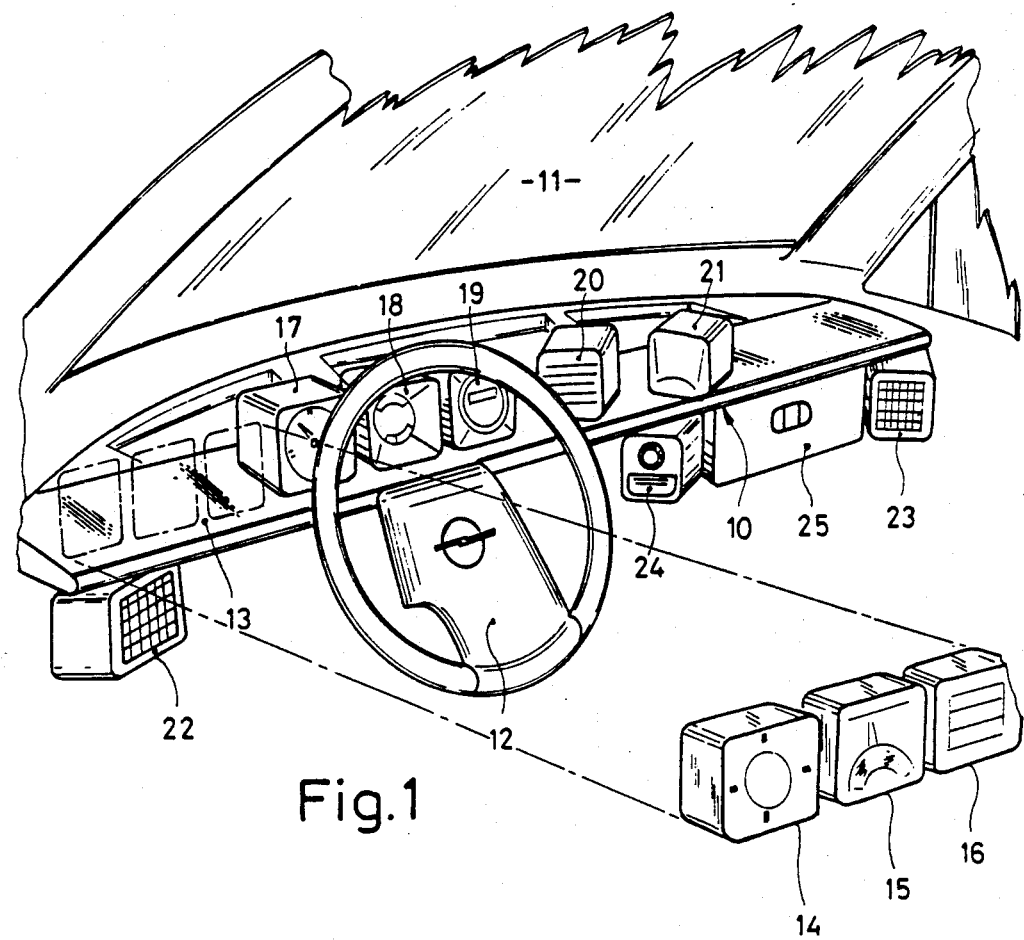
FIG. 1 shows a perspective view of the cockpit of a passenger car, with instrument panel and instruments.

The entire instrument panel of a passenger car is designated by 10 in FIG. 1. FIG. 1 also shows the windshield 11 and the steering wheel 12 of the automobile in question. It is also apparent from FIG. 1 that the instrument panel 10 or a part of same is arranged as a horizontal board, and it reaches accordingly into the passenger space (FIGS. 5 and 6). The various instruments and units are arranged on the top side as well as on the bottom side of this part 13 of the instrument panel 10 which projects like a board. As will be explained below, the instruments and units are fitted onto the instrument panel. Three instruments, designated by 14, 15 and 16, respectively, in FIG. 1, are shown in the dismounted position. These may be, e.g., a tachometer, a combination instrument with fuel gage and warning lights, etc. Further instruments — designated by the reference numerals 17 through 21 — are mounted in various positions on the top side of the instrument panel 10. These may include, e.g., tachometer, a light switch unit and an electrical clock.

Two speaker cabinets 22, 23 and an ashtray 24 are also mounted on the lower side of the instrument panel 10 or of part 13 thereof. A glove compartment 25, which may be rigidly mounted on the instrument panel 10 contrary to the other instruments and units, is also recognizable in FIG. 1. The radio, not shown, associated with the speaker cabinets 22 and 23 may also be mounted rigidly or movably on the lower side of the instrument panel 10.

Figure 2:
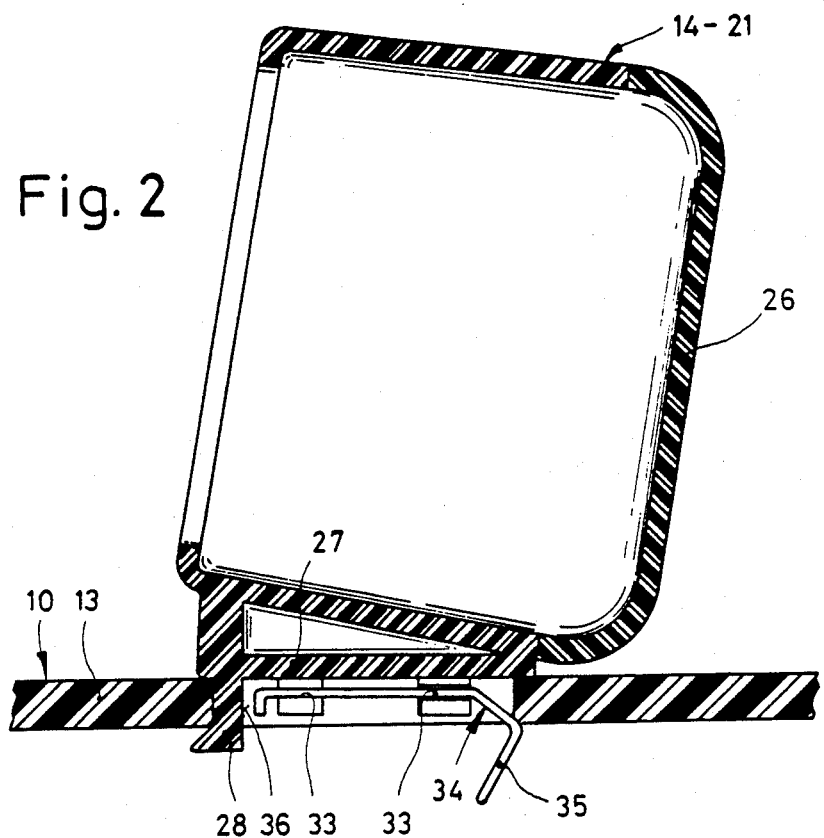
FIG. 2 shows the vertical section of an embodiment of a single instrument taken in the direction of arrows II—II in FIG. 3.
Figure 3:
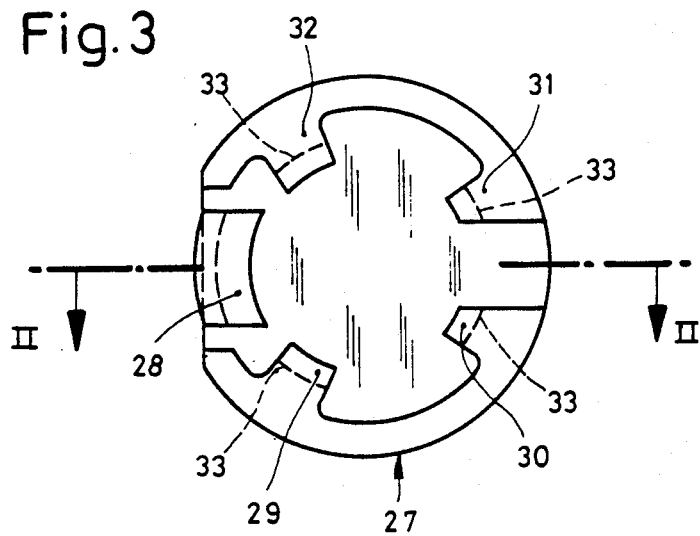
FIG. 3 shows the bottom view of the mounting base of the instrument according to FIG. 2.

FIG. 2 shows the vertical section of the instruments designated by the reference numerals 14 through 21 in FIG. 1. The housing is designated by the reference numeral 26. It is made from a plastic injection molding and has an integrally molded circular mounting base 27 as best seen in FIG. 3. As is seen in FIG. 2, the mounting base 27 is designed such that the housing 26 has a slope angle relative to the approximately horizontal instrument panel part 13.

Figure 4:
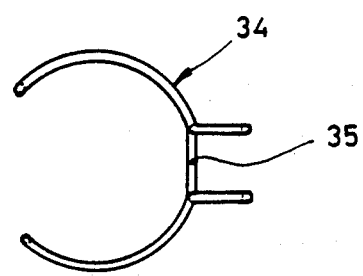
FIG. 4 shows the top view of a tension spring or the detachable fastening of the instrument according to FIGS. 2 and 3.

A plurality of elements are integrally molded with the mounting base 27. A holder is designated by the reference numeral 28, and protuberances, in which the groove sections 33 are integrally molded, are designated by the reference numerals 29 through 32. FIG. 3 clearly shows that these groove sections 33 as a whole form a circular groove. A clip nose type tension spring 34, whose top view, as is seen in FIG. 4, also has an essentially circular shape, is inserted into the groove sections 33 of the mounting base 27. The tension spring 34 has a holding bracket 35 bent downward.

It is also apparent from FIG. 2 that the holder 28, on the one hand, and the holding bracket 35 of the tension spring 34, which is approximately diametrically opposed to the holder 28, on the other hand, serve for the detachable mounting of the instrument housing 26 on the instrument panel 10. The instrument panel 10 and the horizontally disposed part 13 thereof have for this purpose a hole 36 which is also circular, corresponding to the mounting base 27 of the housing 26. The holder 28, on the one hand, and the holding bracket 35 of the tension spring 34, on the other hand, engage behind the hole 36. In the assembled position shown, the instrument housing 26 can be rotated around a vertical axis to bring it into the optimal positions for the driver or for the front seat passenger.

During assembly, the instrument housing 26 with the holder 28 is first pushed through the hole 36 provided in the instrument panel 10. The tension spring 34 is compressed by turning back the housing 26, and the spring snaps with its holding bracket 35 into the hole 36. The vehicle operator can now turn the instrument 26 into the horizontal plane until he reaches the optimal angle of view for the instrument as seen in FIG. 1.

To remove the instrument 26, the instrument is to be tilted while overcoming the resistance of the tension spring 34, after which it is removed from the hole 36 of the instrument panel 10.

FIGS. 5 and 6 shows that the instrument panel 10 has a loop-shaped protuberance 13 which protrudes into the passenger space. A sandwich-like instrument carrier with a top level 37 and a lower level 38 is thus obtained. Holes 36 which are arranged aligned with one another in pairs for simpler manufacture, as provided in both the upper level 37 and the lower level 38. It is thus possible to dispose instruments and/or units on the top side and the lower side of the instrument carrier 13. FIG. 6 shows two housings of such instruments in the assembled position, which are of the same design and are each designated by the reference numeral 26a. A mounting base 27a is integrally molded on the housing 26a, which is preferably made of plastic. The mounting base 27a has two elastically deformable holding members 39 as holders at two diametrically opposed points. In the assembled state of the instrument housing 26a as shown in FIG. 6, the holding members 39 engage behind the holes 36, and they are forced apart by a tension spring 34a.

Consequently, a simple and reliable fastening of the instrument housings to the instrument panel 10 is also ensured in the case of the embodiment according to FIGS. 5 and 6. In their assembled position, the instrument housings 26a can be rotated in the plane of the instrument carrier 13, i.e., around an approximately vertical axis. To remove the instrument housings 26a, only the resistance of the tensions spring 34a must be overcome, which can be achieved by a tilting movement of the instrument housings 26a.

The embodiments of the invention in which an exclusive property of privilege is claimed are defined as follows:

1. An instrument panel assembly for a vehicle body comprising:
    an instrument panel having an outside and an inside and being mounted in the vehicle forward of the seat and having a round circular hole therein;
    an instrument housing of molded plastic having a mounting base of hollow circular shape adapted to fit into the circular hole of the instrument panel, a holder portion integral with the mounting base and extending through the hole in the instrument panel and projecting radially therefrom into engagement with the inside of the instrument panel, and a circumferential groove formed in the hollow of the mounting base;
    and a spring clip independent of the housing and removably seated in the hollow of the mounting base and engaged in the groove in the hollow to urge and maintain the holder portion into engagement with the inside of the instrument panel to thereby attach the housing on the instrument panel and enable turning of the instrument housing relative to the occupant.

2. Instrument panel according to claim 1 characterized in that it comprises as the instrument carrier a loop-like protuberance, and in the upper and lower sides of the protuberance are provided holes, preferably in pairs in alignment with each other, for fitting instruments or units.

3. An instrument panel assembly for a vehicle body comprising:
    an instrument panel having an outside and an inside and being mounted in the vehicle forward of the seat and having a round circular hole therein;
    an instrument housing of molded plastic having a mounting base of hollow circular shape adapted to fit into the circular hole of the instrument panel, a holder portion integral with the mounting base and extending through the hole in the instrument panel and projecting radially therefrom into engagement with the inside of the instrument panel, and a circumferential groove formed in the hollow of the mounting base;
    and a spring clip independent of the housing and removably seated in the hollow and engaging in the groove in the hollow to retain the spring clip on the instrument housing, said spring clip having an internal holding bracket extending into engagement with the inside of the instrument panel at a point diametrically opposed to the holder portion of the mounting base of the housing whereby the holder portion of the housing and the holding bracket of the spring clip are cooperable to attach the housing on the instrument panel and enable turning of the instrument housing relative to the occupant.

* * * * *